(12) United States Patent
Preradovic et al.

(10) Patent No.: US 11,427,157 B2
(45) Date of Patent: Aug. 30, 2022

(54) LOW FREQUENCY OR ULTRA WIDE BAND CONTROL BY BLE IN IDENTIFICATION DEVICE

(71) Applicant: Continental Automotive Systems, Inc., Auburn Hills, MI (US)

(72) Inventors: Djordje Preradovic, Shelby Township, MI (US); Aaron Adler, Rochester Hills, MI (US); David Reimus, Waterford, MI (US); Akshay Choudhari, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/728,108

(22) Filed: Dec. 27, 2019

(65) Prior Publication Data

US 2020/0384951 A1    Dec. 10, 2020

Related U.S. Application Data

(60) Provisional application No. 62/858,604, filed on Jun. 7, 2019.

(51) Int. Cl.
| | | |
|---|---|---|
| B60R 25/00 | (2013.01) |
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |
| B60R 25/24 | (2013.01) |
| H04B 17/318 | (2015.01) |
| H04W 4/80 | (2018.01) |
| H04W 76/10 | (2018.01) |

(Continued)

(52) U.S. Cl.
CPC .......... B60R 25/245 (2013.01); G01S 13/762 (2013.01); H04B 17/318 (2015.01); H04W 4/40 (2018.02); H04W 4/80 (2018.02); H04W 76/10 (2018.02); B60R 2325/101 (2013.01)

(58) Field of Classification Search
CPC ............. B60R 25/245; B60R 2325/101; G01S 13/762; H04W 76/10; H04W 4/80; H04W 4/40; H04B 17/318
USPC ....................................................... 340/5.72
See application file for complete search history.

(56) References Cited

U.S. PATENT DOCUMENTS

2015/0161834 A1    6/2015  Spahl et al.
2016/0325710 A1*  11/2016  Honkanen ............. B60R 25/209

(Continued)

OTHER PUBLICATIONS

International Search Report and Written Opinion dated Sep. 15, 2020 from corresponding International Patent Application No. PCT/US2020/036375.

*Primary Examiner* — Tanmay K Shah

(57) ABSTRACT

A vehicle access system includes an identification device with a first transceiver, a short-range transceiver and a processor configured to control the first transceiver and the short-range transceiver to activate the first transceiver only when a distance measurement between the identification device and a vehicle is within a predefined range as determined utilizing the short-range transceiver.

20 Claims, 2 Drawing Sheets

(51) Int. Cl.
   *G01S 13/76* (2006.01)
   *H04W 4/40* (2018.01)

(56) References Cited

U.S. PATENT DOCUMENTS

| | | |
|---|---|---|
| 2017/0026910 A1 | 1/2017 | Scheim et al. |
| 2017/0200335 A1* | 7/2017 | Da Deppo .......... G07C 9/00309 |
| 2017/0369034 A1* | 12/2017 | Bilik ................... B60R 25/2045 |
| 2018/0099643 A1 | 4/2018 | Golsch et al. |
| 2020/0349781 A1* | 11/2020 | Warrier ................... G01S 11/06 |

* cited by examiner

LOW FREQUENCY OR ULTRA WIDE BAND CONTROL BY BLE IN IDENTIFICATION DEVICE

CROSS REFERENCE TO RELATED APPLICATION

This application claims priority to U.S. Provisional Application No. 62/858,604 filed on Jun. 7, 2019.

TECHNICAL FIELD

The present disclosure relates to operation of vehicle access, identification and control devices, and more particularly to extending battery life of a key fob.

BACKGROUND

Vehicles now commonly include passive entry/passive start (PEPS) systems that utilize a remote authentication device to initiate and authorize access to the vehicle. The remote authentication device is commonly referred to as a key fob that includes a transmitter that communicates with the PEPS system of the vehicle. The PEPS system is powered by the vehicle electric system. However, the remote authentication device is powered by a battery. The useful life of the battery is limited and largely dependent on power consumption utilized to establish the communication link with the vehicle.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle access system according to a disclosed example embodiment includes, among other possible things, an identification device including a first transceiver, a short-range transceiver and a processor configured to control the first transceiver and the short-range transceiver to activate the first transceiver only when a distance measurement between the identification device and a vehicle is within a predefined range as determined utilizing the short-range transceiver.

In another disclosed embodiment of the foregoing system, the first transceiver is in an off condition until being activated by the processor.

In another disclosed embodiment of any of the foregoing systems, the vehicle access system disables vehicle access components in response to the identification device being outside the predefined range.

In another disclosed embodiment of any of the foregoing systems, the distance measurement is based on a received signal strength indicator (RSSI).

In another disclosed embodiment of any of the foregoing systems, the distance measurement is based on one of at least one of time of flight, phase angle, phase delay, angle of arrival, and angle of departure.

In another disclosed embodiment of any of the foregoing systems, a vehicle transceiver includes a first transceiver module for communicating with the first transceiver and a short-range transceiver module for communicating with the short-range transceiver and a vehicle processor configured to control the first transceiver module and the short-range transceiver module, wherein the first transceiver module is in an off condition until the distance measurement between the identification device and a vehicle is within the predefined range.

In another disclosed embodiment of any of the foregoing systems, the vehicle processor activates the first transceiver module in response to the distance measurement being within the predefined range and the distance between the identification device and the vehicle is measured by communication between the first transceiver and the first transceiver module.

In another disclosed embodiment of any of the foregoing systems, the first transceiver and the first transceiver module are configured to measure the range more precisely than the short-range transceiver.

In another disclosed embodiment of any of the foregoing systems, the first transceiver comprises at least one of a low frequency receiver and an ultra-wide band transceiver.

In another disclosed embodiment of any of the foregoing systems, the short-range transceiver comprises a Bluetooth transceiver.

A method of operating a vehicle access control system according to another disclosed embodiment includes, among other possible things, transmitting connection information with a short-range transceiver within an identification device, wherein the identification device also includes a first transceiver that is deactivated. The method further includes establishing a connection between the short-range transceiver and a short-range transceiver module that is part of a vehicle transceiver, wherein the vehicle transceiver further includes a first transceiver module for communicating with the first transceiver within the identification device. The method further includes determining a distance between the identification device and the vehicle based only on communication between the short range transceiver in the identification device and the short range transceiver module of the vehicle transceiver; and activating and establishing a communication link between the first transceiver within the identification device and a first transceiver module within the vehicle transceiver responsive to the determined distance being within a predefined range.

In another disclosed embodiment of the foregoing method, the first transceiver module is in an off condition until the distance measurement between the identification device and a vehicle is within the predefined range.

Another disclosed embodiment of any of the foregoing methods further comprising disabling operation of vehicle access components in response to the identification device being outside of the predefined range.

Another disclosed embodiment of any of the foregoing methods, further comprising determining the distance measurement between the identification device and the vehicle with the first transceiver and the first transceiver module once activated.

Another disclosed embodiment of any of the foregoing methods, further comprising determining the distance between the identification device and the vehicle with the first transceiver and the first transceiver module at a frequency that increases as the identification device is moved closer to the vehicle.

Another disclosed embodiment of any of the foregoing methods, further comprising comparing the determined distance between the identification device and the vehicle with a predefined entry threshold in response to an attempted entry into the vehicle and enabling entry into the vehicle in response to the determined distance being within the predefined entry threshold.

Another disclosed embodiment of any of the foregoing methods, further comprising comparing the distance determined by the first transceiver to a threshold distance and enabling vehicle starting in response to the distance being within the threshold distance.

Another disclosed embodiment of any of the foregoing methods, further comprising reducing a frequency that the distance between the identification device and the vehicle is determined with the short-range transceiver in response to the starting of the vehicle.

In another disclosed embodiment of any of the foregoing methods, determining the distance between the identification device and the vehicle is determined utilizing one of a received signal strength indicator, time of flight, phase angle, phase delay, angle of arrival, and angle of departure.

In another disclosed embodiment of any of the foregoing methods, the first transceiver comprises at least one of a low frequency transceiver and an ultra-wide band transceiver and the short-range transceiver comprises a Bluetooth transceiver.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
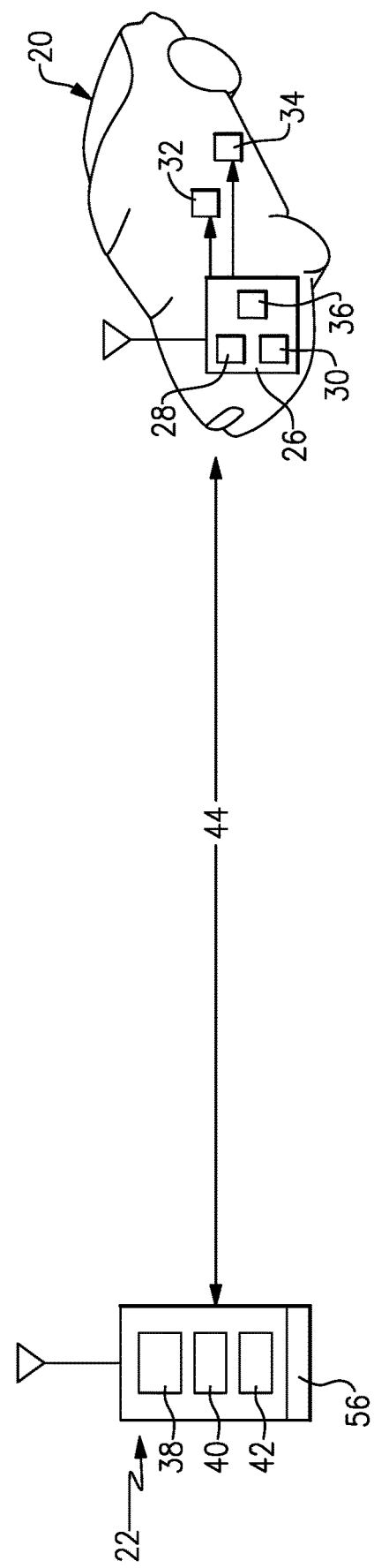
FIG. 1 is a schematic view of an example vehicle and identification device embodiment.
Figure 2:
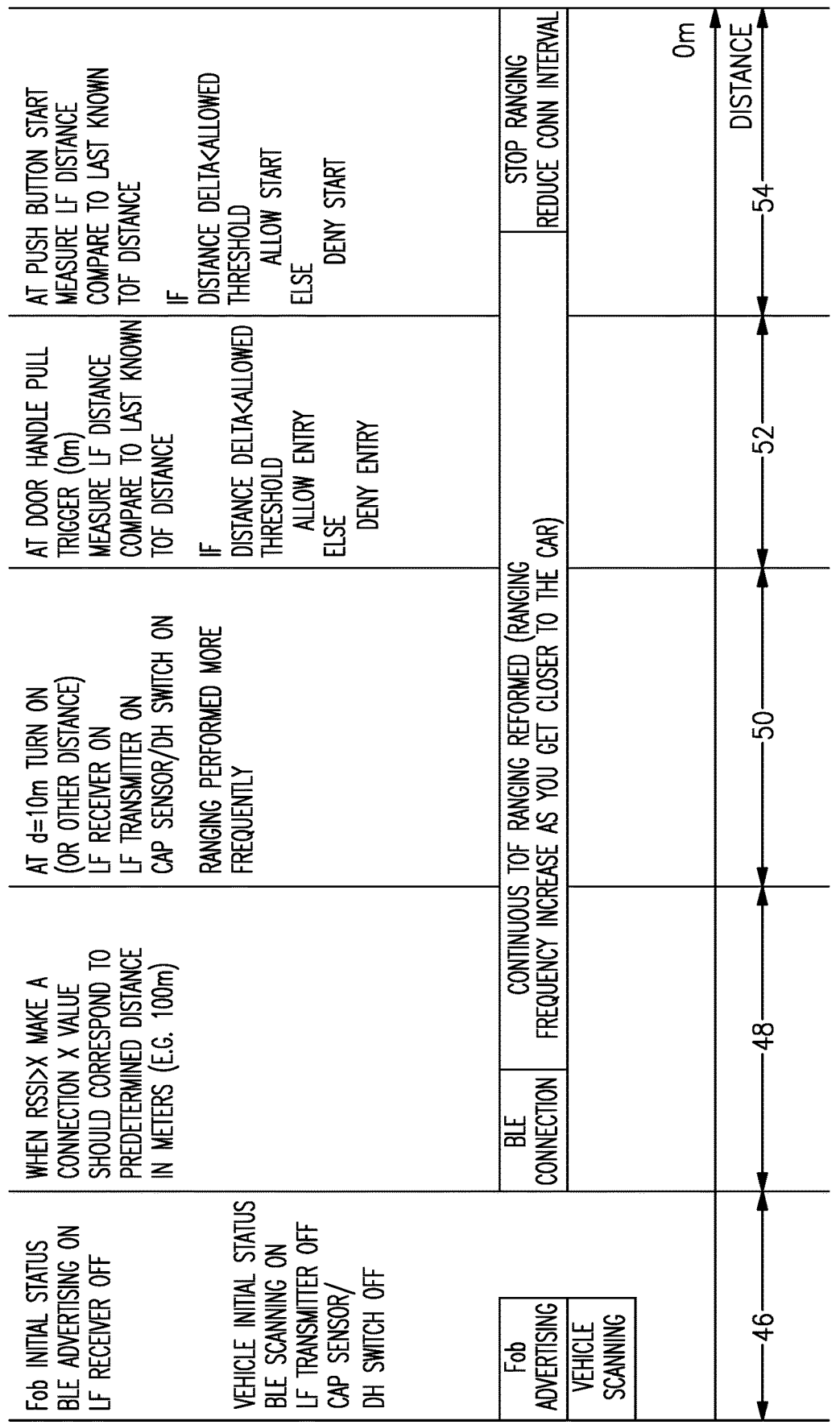
FIG. 2 is a schematic view of stages of communication between the example vehicle and identification device.

Referring to FIGS. 1 and 2, a vehicle 20 includes an access control system 24 that communicates with an identification device or key fob 22. The key fob 22 includes a first transceiver 38 and a Bluetooth Low Energy ("BLE") transceiver 40 capable of performing distance measurement via received signal strength indicator ("RSSI"), time of flight ("TOF"), phase angle or delay, angle of arrival ("AOA"), angle of departure ("AOD"). The key fob 22 further includes a processor 42 configured to control operation of the first transceiver 38 and the BLE transceiver 40. The BLE transceiver 40 prompts activation of the first transceiver 38 once the measured distance 44 between the key fob 22 and the vehicle 20 is within a predefined range to reduce power consumption and lengthen battery life.

The access control system 24 includes a vehicle transceiver 26 with a short-range BLE transceiver module 28, a first transceiver module 30 and a vehicle processor 36. The access control system 24 operates to control and enable operation of vehicle functions that are typically part of passive entry/passive start (PEPS) systems. In one disclosed embodiment, the access control system 24 controls operation of an ignition system 32 and vehicle door latches 34.

In one disclosed embodiment, the first transceiver 38 is a low frequency ("LF") transceiver 38 and is in a deactivated or off condition when the key fob 22 is outside of the predefined range. The LF transceiver 38 is controlled by the processor 42 in response to measurements taken by the BLE transceiver 38. In one example embodiment, the BLE transceiver 38 is a BLE chip and determines the distance 44 with a RSSI. The power state (on/off) of the LF transceiver 40 inside key fob 22 is controlled by the processor 42 based on information regarding distance that is determined utilizing only the BLE transceiver 38. The LF transceiver 40 draws most of the quiescent current from the battery 56 in the key fob 22.

Accordingly, when the LF transceiver 40 is off, only the BLE transceiver 38 draws power from the battery 56. The reduced power drawn by the BLE transceiver 38 enables a significant increase in the operational life of the battery 56.

Referring to FIG. 2, with continued reference to FIG. 1, a first phase of operation of the key fob 22 is indicated at 46. The phase indicated at 46 is one where the key fob 22 is out of range of the vehicle transceiver 26. In the first phase 46, the BLE transceiver 38 sends out connection data in a process known as advertising at regular intervals. The LF transceiver 40 is off and does not receive or transmit any data from the key fob 22. The short-range BLE transceiver module 28 of the vehicle transceiver 26 is active and scanning for advertisements from the key fob 22. The first transceiver module 30 is inactive and not operating to receive signal in the first phase 46.

In one example embodiment, during the first phase 46, the access control system 24 disables operation of the ignition system 32 and the door handles 34. Disabling operation of the door handles 34 prevents the vehicle transceiver 26 from triggering transmissions in response to a brute force attack on the vehicle. Disabled the door handles 34 during the first phase 46 when the key fob 22 is nowhere near the vehicle 20 prevents the unintended trigger of a response by repeated pulling on the door handles 34. It should be appreciated, that disabling of the door handles 34 and ignition are disclosed by way of example and other vehicle features may be disabled in the first phase to prevent unintended triggering of the vehicle transceiver 26 that could be utilized to gain unauthorized access to the vehicle.

Once the key fob 22 moves into closer proximity with the vehicle 20 as shown in the second phase 48, a communication link is established. In one disclosed embodiment, the second phase 48 occurs when the distance 44 is less than about 100 meters (328 feet). As appreciated, other distances may be utilized and are within the contemplation of this disclosure. Moreover, although the disclosed example utilizes RSSI to determine the distance between the key fob 22 and the vehicle 20, other devices and techniques for determining distance can be utilized and are within the contemplation of this disclosure.

In the second phase 48, a communication link is established between the BLE transceiver 38 within the key fob 22 and the BLE transceiver module 28 within the vehicle transceiver 26. The LF transceiver 40 within the key fob 22 and the LF transceiver module 30 within the vehicle 20 remain off and/or deactivated. The distance 44 between the key fob 22 and the vehicle 20 is monitored and updated. Accordingly, a BLE communication link is established while the LF transceiver 40 receiver remains off.

When the key fob 22 establishes a communication link with the vehicle 20, the BLE transceiver 38 and the BLE transceiver module 28 perform range measurements between the key fob 22 and the vehicle 20. The range measurements can be performed utilizing known range devices and techniques such as RSSI, TOF, Phase, AOA, and AOD. The measured range is periodically updated and stored in the key fob 22.

In a third phase 50, the key fob 22 is closer to the vehicle 22 and prompt activation of the LF transceiver 40. In one disclosed embodiment, once the key fob 22 is within 10 meters (32 feet) of the vehicle 20, the processor 42 turns on the LF transceiver 40 inside the key fob 22. The vehicle transceiver 26 also will activate the LF transceiver module 30 to establish an LF communication link.

As appreciated, in one disclosed embodiment, the predefined threshold distance for activation the LF transceiver is 10 meters, however other distances may be utilized and are within the contemplation of this disclosure.

Once the LF transceiver 38 is activated, the LF communication link is utilized to perform ranging measurements. The LF communication link is capable of better and more accurate distance and position determinations as compared to the BLE communication link. Accordingly, the LF communication link is utilized to provide precise distance and positon determinations that are utilized for measurements used for passive entry and passive start functions of the vehicle 20.

In one example embodiment, the distance between the key fob 22 and the vehicle 20 with the LF transceiver 40 and the first transceiver module 30 is at a frequency that increases as the identification device is moved closer to the vehicle 20.

In a fourth phase 52, the LF communication link is utilized to provide the precise measurements required to enable access to the vehicle. In one disclosed embodiment, actuation of the door latch 34 triggers a comparison of the measured distance determined by the LF communication link and a predefined threshold distance. The precise positon of the key fob 22 relative to the vehicle 20 is determined by the communication link between the LF transceiver within the key fob 22 and the vehicle transceiver 26 instead of utilizing the less accurate BLE communication link.

In a fifth phase 54, actuation of the vehicle ignition system 32 prompts another comparison to assure that the key fob 22 is within the vehicle to enable starting and operation of the vehicle. As appreciated, the relative positon of the key fob 22 required to meet the predefined threshold value can be any distance determined to indicate a desired position of a vehicle operator for vehicle operation. Again, the more accurate LF communication link is utilized to provide the desired precision of distance measurements to enable operation of the vehicle ignition 32.

Moreover, meeting the desired position threshold to enable operation of the vehicle may also prompt a reduction in the frequency of ranging and distance determination. As appreciated, the distance and ranging information would be reinstituted at increased frequencies based on vehicle operation.

In another disclosed embodiment, an ultra-wide band ("UWB") transceiver is utilized instead of the example LF transceiver. The UWB transceiver is operated like the LF transceiver by being held inactive until the BLE transceiver indicates that the key fob 22 is within a predetermined distance from the vehicle 20. The UWB transceiver is then utilized to establish a communication link and to determine a distance between the key fob 22 and the vehicle 20.

Accordingly, the example key fob 22 initially advertises utilizing the BLE transceiver 38 to keep power consumption low until a communication link is established. Once the BLE communication link is established, a range between the key fob 22 and vehicle is monitored and updated to prompt establishment of more accurate LF and/or UWB communication with the vehicle once within a predefined threshold distance. The LF and/or UWB communication link with the vehicle provides increased ranging precision and accuracy needed for operation of the vehicle access system. Operation of the BLE transceiver only until within a close proximity to the vehicle can significantly increase battery life and in some embodiments such an implementation in PEPS system more than double battery life.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle access system comprising:
an identification device not comprised in a vehicle, the identification device including a first transceiver, the identification device further including a short-range transceiver different from the first transceiver and a processor configured to control the first transceiver and the short-range transceiver to activate the first transceiver only when a distance measurement between the identification device and the vehicle is within a predefined range as determined utilizing the short-range transceiver.

2. The vehicle access system as recited in claim 1, wherein the first transceiver is in an off condition until being activated by the processor.

3. The vehicle access system as recited in claim 2, wherein the vehicle access system disables vehicle access components in response to the identification device being outside the predefined range.

4. The vehicle access system as recited in claim 1, wherein the distance measurement is based on a received signal strength indicator (RSSI).

5. The vehicle access system as recited in claim 1, wherein the distance measurement is based on one of at least one of time of flight, phase angle, phase delay, angle of arrival, and angle of departure.

6. The vehicle access system as recited in claim 1, including a vehicle transceiver including a first transceiver module for communicating with the first transceiver and a short-range transceiver module for communicating with the short-range transceiver and a vehicle processor configured to control the first transceiver module and the short-range transceiver module, wherein the first transceiver module is in an off condition until the distance measurement between the identification device and a vehicle is within the predefined range.

7. The vehicle access system as recited in claim 6, wherein the vehicle processor activates the first transceiver module in response to the distance measurement being within the predefined range and the distance between the identification device and the vehicle is measured by communication between the first transceiver and the first transceiver module.

8. The vehicle access system as recited in claim 7, wherein the first transceiver and the first transceiver module are configured to measure the range more precisely than the short-range transceiver.

9. The vehicle access system as recited in claim 1, wherein the first transceiver comprises at least one of a low frequency receiver and an ultra-wide band transceiver.

10. The vehicle access system as recited in claim 8, wherein the short-range transceiver comprises a BLUETOOTH® transceiver.

11. A method of operating a vehicle access control system comprising:
   transmitting connection information with a short-range transceiver within an identification device, the identification device not comprised in the vehicle, wherein the identification device also includes a first transceiver that is deactivated, the first transceiver being different from the short-range transceiver;
   establishing a connection between the short-range transceiver and a short-range transceiver module that is part of a vehicle transceiver, wherein the vehicle transceiver further includes a first transceiver module for communicating with the first transceiver within the identification device;
   determining a distance between the identification device and the vehicle based only on communication between the short-range transceiver in the identification device and the short-range transceiver module of the vehicle transceiver; and
   activating and establishing a communication link between the first transceiver within the identification device and a first transceiver module within the vehicle transceiver responsive only to the determined distance being within a predefined range.

12. The method as recited in claim 11, wherein the first transceiver module is in an off condition until the distance measurement between the identification device and a vehicle is within the predefined range.

13. The method as recited in claim 12, further comprising disabling operation of vehicle access components in response to the identification device being outside of the predefined range.

14. The method as recited in claim 12, further comprising determining the distance measurement between the identification device and the vehicle with the first transceiver and the first transceiver module once activated.

15. The method as recited in claim 13, further comprising determining the distance between the identification device and the vehicle with the first transceiver and the first transceiver module at a frequency that increases as the identification device is moved closer to the vehicle.

16. The method as recited in claim 15, further comprising comparing the determined distance between the identification device and the vehicle with a predefined entry threshold in response to an attempted entry into the vehicle and enabling entry into the vehicle in response to the determined distance being within the predefined entry threshold.

17. The method as recited in claim 16, further comprising comparing the distance determined by the first transceiver to a threshold distance and enabling vehicle starting in response to the distance being within the threshold distance.

18. The method as recited in claim 17, further comprising reducing a frequency that the distance between the identification device and the vehicle is determined with the short-range transceiver in response to the starting of the vehicle.

19. The method as recited in claim 11, wherein determining the distance between the identification device and the vehicle is determined utilizing one of a received signal strength indicator, time of flight, phase angle, phase delay, angle of arrival, and angle of departure.

20. The method as recited in claim 11, wherein the first transceiver comprises at least one of a low frequency transceiver and an ultra-wide band transceiver and the short-range transceiver comprises a BLUETOOTH® transceiver.

* * * * *